United States Patent [19]

Armitage

[11] 4,213,356
[45] Jul. 22, 1980

[54] WORK CUTTING

[76] Inventor: Harry J. Armitage, 1546 Cavitt Rd., Monroeville, Pa. 15146

[21] Appl. No.: 974,348

[22] Filed: Dec. 29, 1978

Related U.S. Application Data

[63] Continuation of Ser. No. 527,491, Nov. 26, 1974, abandoned.

[51] Int. Cl.$^2$ .................... B23B 3/06; B23B 3/36
[52] U.S. Cl. ......................... 82/2 B; 82/24 R; 82/32
[58] Field of Search ............... 82/2 B, 24 R, 29 A, 82/32, 46–49; 407/117

[56] References Cited

U.S. PATENT DOCUMENTS

| | | | |
|---|---|---|---|
| 2,809,333 | 10/1957 | Wagner | 82/29 A |
| 2,940,160 | 6/1960 | Novkov | 407/117 |
| 3,008,071 | 11/1961 | Karger | 82/29 A |
| 3,168,846 | 2/1965 | Binns | 82/24 R |
| 3,172,191 | 3/1965 | Schoffel et al. | 407/117 |
| 3,316,784 | 5/1967 | Johnson et al. | 82/24 R |
| 3,443,461 | 5/1969 | De Biasse | 82/32 |
| 3,520,217 | 7/1970 | Engelbrecht | 82/24 R |
| 3,663,027 | 5/1972 | Klipping | 82/32 X |
| 3,725,651 | 4/1973 | Cutler | 82/2 B |
| 3,746,955 | 7/1973 | Kobayashi | 82/2 B |

Primary Examiner—Leonidas Vlachos
Attorney, Agent, or Firm—Hymen Diamond

[57] ABSTRACT

A groove is cut near the end of a roll to sever the end from the remainder of the roll. The roll is rotated by a high-power motor here called the spindle motor. A cutting tool which cuts the groove is mounted on a cross-slide which is driven towards and away from the work by a substantially lower-power motor here called the cutting-tool motor. The cross-slide carries the cutting tool into cutting engagement with the work or retracts the tool. The cross-slide motor may, independently of the spindle motor, be readily reversed to retract the tool from the work and again reversed to reengage the tool with the work. If the tool encounters excessive resistance the cutting-tool motor is reversed and the tool is retracted. The speeds of the spindle, on which the roll is rotated, and of the cutting-tool motor are controlled and coordinated so that the cutting of the groove is effected at a substantially constant chip load, that is, constant thickness of chip at a given rate. The chip load can be varied, to cut different materials, by changing the relationship between the spindle speed and the cutting-tool motor speed. The surface speed of the cutting is controlled by the distance between the cutting edge of the tool and the center of the roll and is maintained constant by a position potentiometer whose setting is determined by the radial position of the tool. The cutting-tool motor is moveable along the roll on a carriage which is itself moveable by the cutting-tool motor on the support for the roll. Hydraulic means is provided to secure the carriage to the support in the position where the cutting is to take place. In addition, the tool-holder support is subjected to high lateral thrust by a brace on the carriage. Irregular movement and chattering of the tool under the high stress to which it is subjected are thus prevented.

17 Claims, 13 Drawing Figures

WORK CUTTING

REFERENCE TO RELATED APPLICATIONS

This application is a continuation of Application Ser. No. 527,491 filed Nov. 26, 1974 to Harry J. Armitage for WORK CUTTING and now abandoned. Application No. 527,491 is itself a continuation of Application Ser. No. 359,848 filed May 14, 1973 to Harry J. Armitage for WORK CUTTING and now abandoned.

BACKGROUND OF THE INVENTION

This invention relates to work cutting or grooving apparatus and has particular relationship to such cutting or grooving where the work is of substantial mass. In the interest of concreteness this application deals with the grooving of rolls such as are used in the steel and related industries. Such use is typical of work to which this invention is applicable. It is to be understood that this practice is adopted only to aid those skilled in the art in practicing this invention and not with any intention of limiting the scope of this invention; this invention is applicable to the cutting or grooving of other work than rolls.

Typically, a roll may be composed of tool steel or a ferretic alloy or other material and may have a diameter of forty inches or more and a weight of seventy-five or one hundred tons or more. The roll is cast and when it solidifies, it has an indentation on the head end due to impurities and shrinkage, and it is necessary that this end be severed or machined off. The practice in severing the end is to groove the end of the roll to a substantial depth and then to break off the end. In accordance with the teachings of the prior art the roll is rotated and as it is rotated, it is grooved by a cutting tool which is moved transversely by manual operation of a crank into cutting engagement with the roll. At the same time the speed of rotation of the roll is increased by hand to correspond to the lateral cranked movement.

This practice is highly time consuming.

Typically, a forty-inch diameter roll is grooved to a diameter of about ten inches and is then broken off. This grooving in accordance with the practice of the prior art consumes up to thirty-two hours cutting time. In addition, the mounting of the roll for cutting consumes about two hours.

It is an object of this invention to overcome the disadvantages of the prior art and to provide, for work cutting or grooving, apparatus which shall operate at a high cutting rate.

SUMMARY OF THE INVENTION

The rate at which work-cutting or grooving takes place is determined by the depth of the cut which is taken in the work and by the chip load. It has been realized that the low rate achieved in the practice of the prior art results from the fact that only a very thin cut (low chipload) can be taken in this practice. An additional complicating factor is the accumulation of chips in the groove cut and the time consumed in removing the chips. To reduce the accumulation of chips the cut is taken at a low rate so that the chips are small. A further complicating factor is the dulling of the cutting tool, usually a tungsten-carbide bit, by the cutting.

It has been realized, in arriving at this invention, that to increase the rate of cutting or grooving, the cutting tool must be power driven. Hoewever, it has been discovered that the cutting cannot economically or effectively be driven through gearing from the drive which rotates the work. (Compare, for example,, Musial et al. U.S. Pat. No. 3,460,366.) The work drive, for a typical roll, is a motor of about twenty-five or fifty to one hundred horsepower which rotates the roll at from ten to fifty revolutions per minute and the coordination of the control of this motor with the cutting operation is not readily accomplished in accordance with the teaching of the prior art.

In accordance with this invention the work and cutting tools are driven by separate drives whose speed is controllable. Typically, the drive for a roll of forty inches diameter is a fifty to one hundred horsepower DC motor and the drive for the cutting tool is a DC motor of about three to five horsepower. The speed of the work or roll motor and of the work spindle is controlled in dependence upon the depth of penetration of the cut. The work motor is interconnected typically through a tachometer on the spindle with the cutting-tool motor so that the speed of the cutting-tool motor is coordinated with the speed of rotation of the work. The cutting-tool motor is also interconnected with the work motor so that the speed of the work is coordinated with the speed of the cutting-tool motor. The interconnection between the work motor and the cutting-tool motor includes a speed adjustment for the cutting-tool motor which may be set to set the depth of cut into the work or chip load. The speeds of the work motor and cutting-tool motor are usually set so that the cutting speed is at a constant surface rate.

The tool is a tungsten-carbide bit which is securely bolted into a seat in a tool holder at an angle such that the force of the tool on the work, acting against the walls of the seat, maintains the tool in the seat.

The tool holder is integral with a massive plate or tool support. Both the tool holder and its support taper away from the tool on the side on which the tool is secured. The flow of chips from the work through the groove is thus facilitated. The tool-holder support is subjected to side thrust by a brace. It has been found that in the practice of this invention a forty-inch diameter roll can be cut to the required groove diameter in about three hours; two hours setup time and one hour cutting time. Typically the width of the groove cut is about one and one-half inches.

It is desirable that the diameter to which the groove is cut be maintained with reasonable accuracy. If the diameter is too small, the main part of the roll breaks away from the end of the roll while the toll is in the lathe and both the roll and the lathe are damaged. In accordance with this invention provisions are made for terminating the cutting of the groove to avoid such a catastrophe.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

The dimensions in FIGS. 5 and 6 are presented for the purpose of aiding those skilled in the art to practice this invention and not with any intention of in any way limiting this invention.

DETAILED DESCRIPTION OF EMBODIMENT

The apparatus shown in the drawings includes a lathe 11 (FIG. 1) provided with facilities for mounting and rotating the work W (FIG. 3), a drive 13 (FIG. 1) for the work W, a carriage 14 carrying a cross-slide 16, a cutting-tool assembly 15, on the cross-slide 16, and a drive 17 for the carriage 14 and the cross-slide 16. The drive 17 serves, both, to set the carriage 14 with the tool assembly 15 in cutting position relative to the work W and to drive the cutting-tool assembly 15 into cutting engagement with the work W. This apparatus also includes servo drive system 18 for controlling the tool assembly. This system includes the servo controllers 19 and 20 (FIGS. 8 and 9) and related relaying and switching components.

Figure 13:
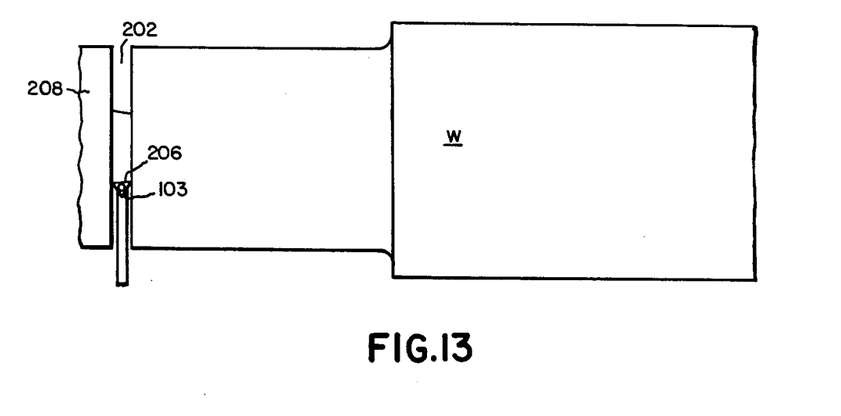

The lathe 11 is generally conventional and includes a bed 21 (FIGS. 1, 13) having one or more ways, typically, a front way 23, a center way 25 and a rear way 27 along which the tool assembly 15 is moveable longitudinally. For this purpose a rack 29 (FIG. 3) is mounted below the front way 23. The drive 17 for the carriage 14 and cross-slide 16 includes a gear or pinion 31 (FIG. 3) which engages the rack 29 and when rotated moves the carriage 14 along the ways 23, 25, 27. The lathe 11 also has a head stock 33 (FIG. 1) including a driving spindle 35 for driving a center 37 and a tail stock (not shown) including a spindle (not shown). The work W is mounted between the center 37 on the head stock 33 and a center (not shown) on the tail stock. The lathe 11 is also provided with conventional chucks (not shown in detail) for holding the work W. Pins or brackets 39 (FIGS. 2, 3) for supporting the power track 41 are secured to the bed 21. The power track 41 carries the cables (not shown) for supplying power to the driving components of the apparatus. There is also a junction box 43 (FIG. 2) for the power track 41 which is mounted on the bed 21. In the interest of convenience the lathe will herein be considered as viewed by one standing before the front way 23 with the head stock on the left and the tail stock on the right.

Figure 1:
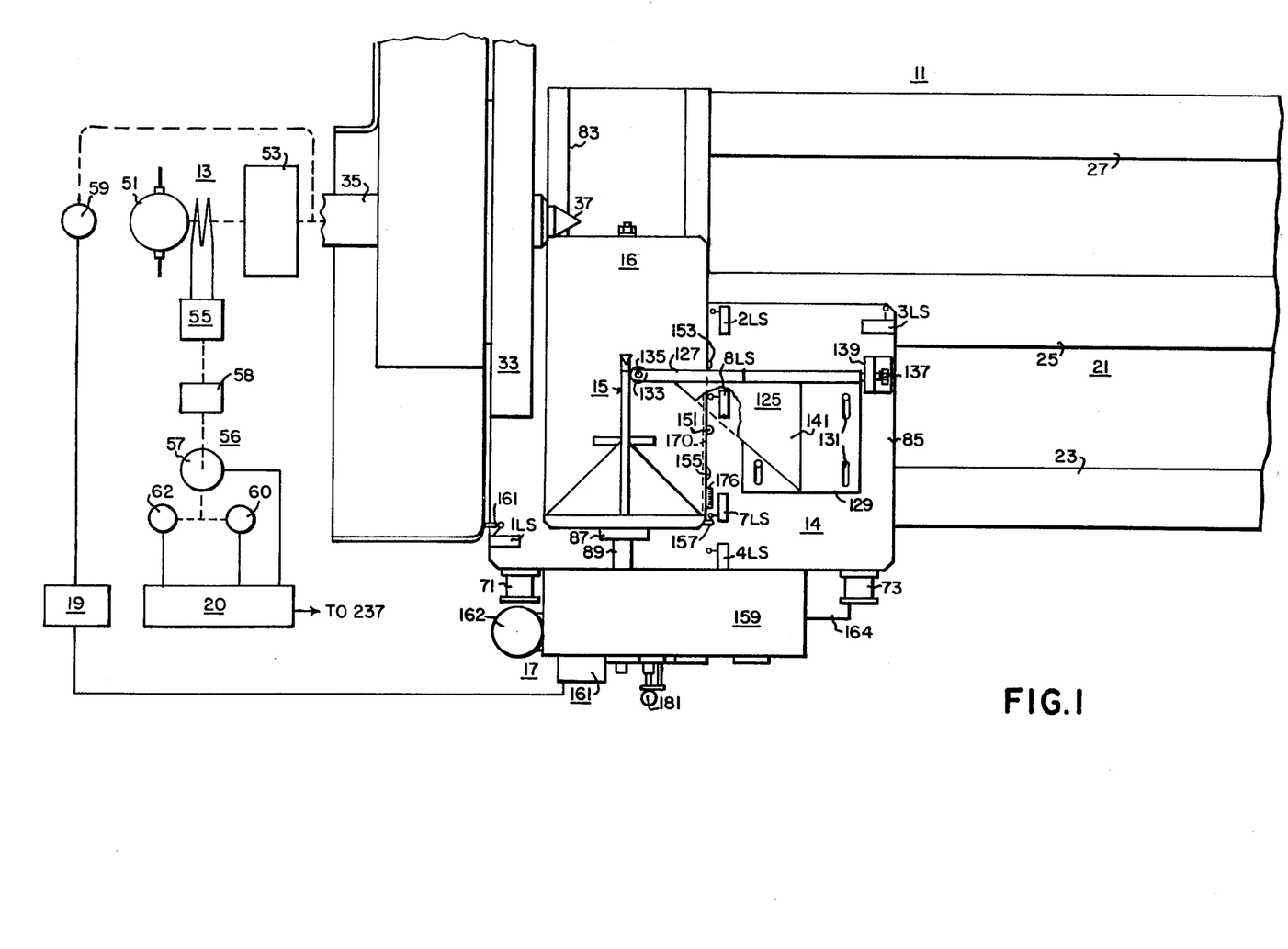
FIG. 1 is a plan view of apparatus in accordance with this invention with the work removed for clarity.
Figures 2, 4, 5, 6:
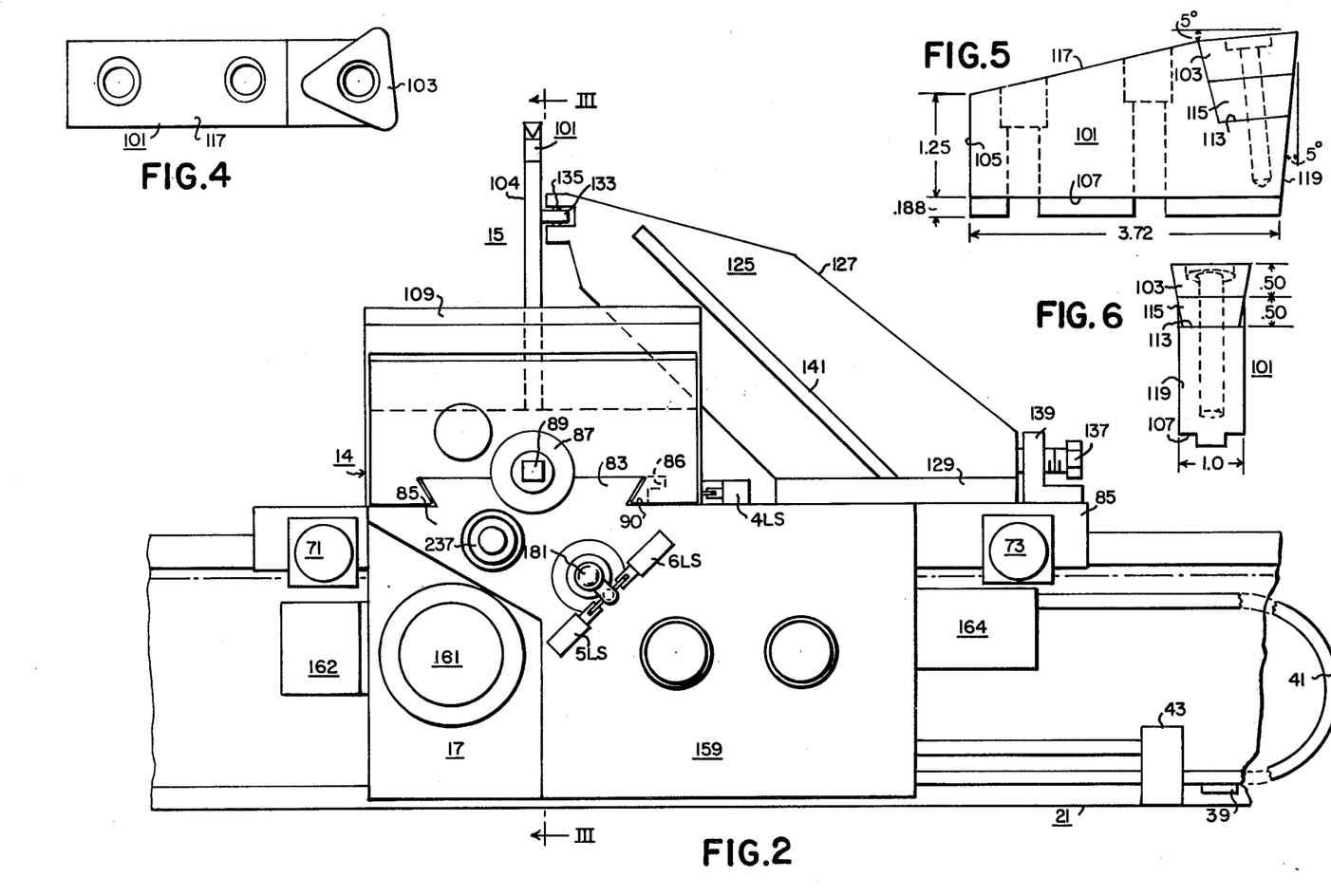
FIG. 2 is a view in side elevation of this apparatus.
FIG. 4 is a plan view of the cutting-tool assembly used in the practice of this invention.
FIG. 5 is a view in side elevation of this assembly.
FIG. 6 is a view in end elevation of this assembly.

The drive 13 for the lathe includes a motor 51 (FIG. 1) with adequate power to overcome the inertia of the work W which may weigh one hundred tons. Typically a fifty or one hundred horsepower DC motor is used. The motor 51 is here sometimes called the spindle motor and is connected in driving relationship with the spindle 35 through a reduction gearing system 53. Typically, the speed of motor 51 may vary over a range of 400 to 1600 RPM and the speed of the work W may vary between 10 and 60 RPM for rolls of 15 to 50 inches diameter. The motor speed is controlled by a variable transformer (VARIAC or POWERSTAT) whose rotor (not shown) is driven by a drive 56 (FIG. 1). Typically, the variable transformer 55 varies the field of the motor 51 to control the speed. The field of motor 51 may also be varied by a rheostat or the armature of the motor 51 may be controlled. A tachometer 59 is driven directly from the spindle 35. The output of this tachometer 59 is supplied to the automatic-feed potentiometer 61 (FIG. 9) in the servo drive 18 which controls the speed of the drive 17 for the carriage 14. The potentiometer 61 may be set to set the chip load.

The drive 56 includes a motor 57 (FIG. 8) which is connected to the variable transformer 55 through a gear reducer 58. The motor 57 is driven from servo controller 20 and the tachometer 60 feeds back speed intelligence to servo controller 20. The motor 57 also drives a servo potentiometer 62 which also feeds back position intelligence to servo controller 20.

The carriage 14 (FIG. 3) is slideable along the ways 23, 25, 27 by cooperation of the pinion 31 and rack 29. The carriage 14 has gibs 65 and 67 which engage the ways 23 and 25 laterally and a keeper plate 69 which is slideable along the lower edges of the ways 25 and 27. The carriage 14 may be locked in any position along the ways 23, 25, 27 by hydraulic cylinders 71 and 73 (FIGS. 1, 2, 3) and hydraulic clamp 75 (FIG. 3) and another hydraulic clamp (not shown) The piston rod 79 of cylinder 73 locks gib 65 against way 23 and the piston rod (not shown) of cylinder 71 locks another gib (not shown) against way 23. The hydraulic clamps 75 and the one not shown actuate the keeper plate 69 to lock the carriage 14 against the ways 25 and 27.

Figure 3:
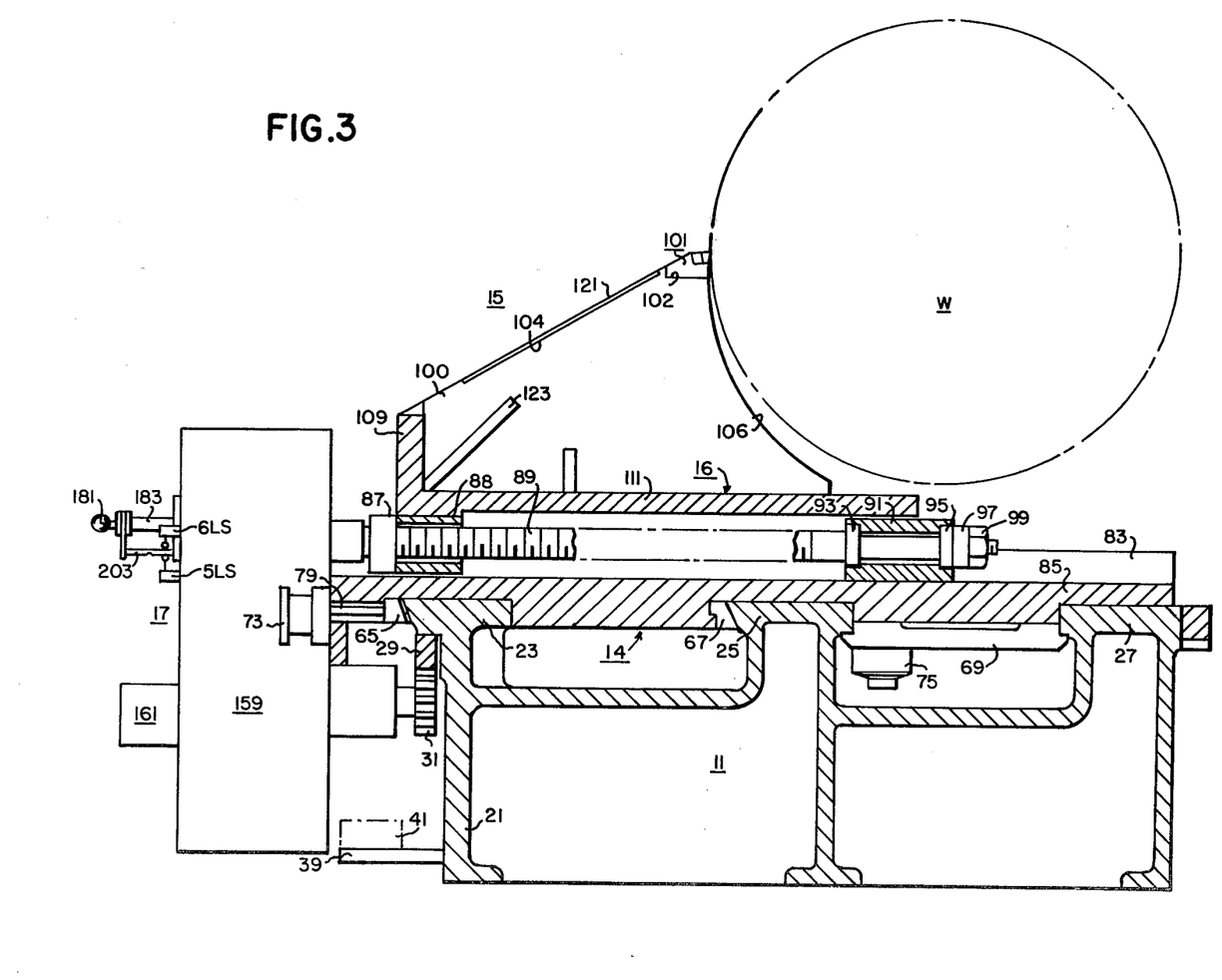
FIG. 3 is a view in transverse section taken along line III—III of FIG. 2 but with the work left unsectioned.

The cross-slide 16 is slideable along a dovetail 83 (FIG. 2) extending from the base 85 of the carriage 14. The cross-slide 16 has gibs 86 which engage the dovetail 83 on one side. The bearing surfaces (moveable) of the dovetail 83 and gib 86 have a coating 90 of polytetrafluoreothylene (RULON) to reduce friction and improve the bearing. Typically, the coating is 0.050 inch thick. A nut 87 on a carrier 88 (FIG. 3) is secure to the cross-slide 16. The nut 87 is engaged by a screw 89 driven by the drive 17 which passes through an opening in the carrier 88 and engages an anchor block 91 on the base 85 (FIG. 3). The block 91 is provided with thrust bearings 93 and 95 which are engaged respectively by a shoulder on one side of the block 91 and a shim 97 secured to the screw 89 by a nut 99 on the other side of the block 91. On rotation of the screw 89, the nut 87 causes the cross-slide 16 to move along the dovetail 83.

The portion of the cross-slide 16 above the track engaged by the dovetail 83 is generally L-shape having an elongated member 111 from whose end a short member 109 tapered at the top entends (FIG. 3). A supporting plate 100 for the tool-assembly 15 is welded to the members 109 and 111 of the cross-slide 16 and is essentially integral with these members. The member 111 is massive typically 6½ to 7 inches thick and 2 feet by 4 feet. This integral structure renders feasible the cutting at high chip loads, typically, a 1¼ inch wide chip at 0.025 inch to 0.030 inch feed per revolution. Gussets 123 are welded to the plate 100 and to the members 109 and 111. The plate 100 has a tip in which a seat 102 (FIG. 3)

for the tool-assembly 15 is seated. A side 104 of the plate 100 tapers from the seat 103 so as to facilitate the flow of chips from the work W and has a lining 121 of hardened tool steel or the like to minimize wear from the chips. The other side 106 of the plate 100 extending from the tip is curved correspondingly with, but to clear the work, W. The curved side 106 permits the extension of the plate 100 along the member 111 so as to add additional support for the tool block 101 and thus to add a greater bearing surface for loads applied through the tool.

The carriage 14 also includes a tool brace 125 (FIGS. 1 and 2) for applying lateral thrust to the tool assembly 15. The brace 125 includes a tapered vertical plate 127 extending integrally but at an angle from a horizontal plate 129. The horizontal plate 129 is provided with slots 131 through which it may be adjustably secured to the base 85. The plate 127 is bifurcated at its tip and is provided with a roller 133 supported on a pin 135. The roller 133 engages the plate 100 applying a thrust in the direction of the center 37 to the tool holder. The thrust may be set by a bolt 137 which may be screwed into the projecting side of an angle 139 secured to the base 85. The brace is reinforced by a gusset 141. During a cutting operation the plate 100 moves relative to the brace 125 with the roller 133 rolling along the surface of the plate 100.

The tool-assembly 15 includes a tool holder 101 and a tool or bit or insert 103 of tungsten carbide or the like. The tool holder 101 is a block (FIGS. 4, 5, 6) whose one side 105 and base 107 are at right angles so that the holder may be seated firmly in the seat 102 of the plate 100. The holder 101 has a seat 113 (FIGS. 5, 6) for the bit 103 and the anvil 115 to which the bit 103 is secured. The top 117 of the holder 101 tapers away from the seat 113 coextensively with the side 104 of plate 100 so as to assure proper flow of the chips from the work W. The remaining side 119 also is inclined away from the work W. The seat 113 is at a small angle to the base 107. The bit 103 and anvil 115 are blocks of triangular cross-section with the sides of the blocks tapered at a small angle. The holder 101 is bolted into the seat 102 of plate 100. The bit 103 is secured to the seat 113 on the anvil by a bolt. During cutting the bit 103 is at such an angle to the work W that the bit 103 is locked in the seat 113 and tool holder 101 in the seat 102 by the reactive force exerted by the Work W on the bit 103.

A plurality of limit switches 1LS, 2LS, 3LS, 4LS, 5LS, 6LS, 7LS and 8LS are mounted on the base 85 (FIGS. 1, 2, 8, 9). These limit switches have the functions, contact (FIG. 8) and standby status shown in the following Table I:

TABLE I

| Limit Switch | Function | Contacts (Figure 9) | Standby Status |
|---|---|---|---|
| 1LS | Carriage Left (FIG. 1) | 1LS1 | Normally Closed |
|  | End of Bed | 1LS2 | Normally Open |
| 2LS | Cross-Slide- | 2LS1 | Normally Closed |
|  | End of Travel In | 2LS2 | Normally Open |
| 3LS | Carriage Right | 3LS1 | Normally Closed |
|  | End of Travel | 3LS2 | Normally Open |
| 4LS | Cross-Slide | 4LS1 | Normally Closed |
|  | Out | 4LS2 | Normally Open |
| 5LS | Cross-Slide (FIG. 2) | 5LS1 | Normally Closed |
|  | Mode | 5LS2 | Normally Open |
| 6LS | Carriage - | 6LS1 | Normally Closed |
|  | Mode | 6LS2 | Normally Open |
| 7LS | Tool Retract Complete (Figure 1) | 7LS | Normally Open |

TABLE I-continued

| Limit Switch | Function | Contacts (Figure 9) | Standby Status |
|---|---|---|---|
| 8LS | Depth of Cut | 8LS | Normally Open |

Figure 10:
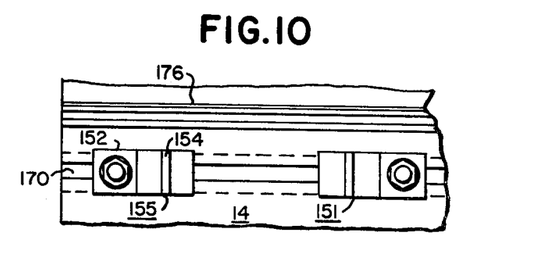
FIG. 10 is a fragmental view in side elevation showing the manner in which the apparatus shown in FIG. 1 is set for a predetermined depth of cut.
Figure 11:
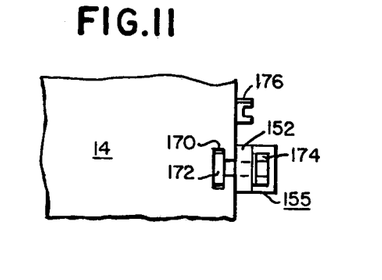
FIG. 11 is a fragmental view in end elevation of the fragment shown in FIG. 10.

Limit switch 1LS is operable by pin 161 (FIG. 1) on the head stock 33 and near the left end of the bed 21. This limit switch prevents the carriage 14 from being driven into the head stock 33. Limit switch 2LS is actuated by pin 153; it prevents the cross-slide from being moved by drive 17 beyond the dovetail 83. Limit switch 3LS is actuable by a dog (not shown) on the tail stock (not shown). This switch 3LS prevents the drive 13 from moving the carriage 14 off the bed. Limit switch 4LS is operable by pin 157. This switch prevents the cross-slide 16 from being driven into the gear box 159 at the end of the dovetail 83. Limit switch 5LS (FIG. 2) is actuated by notch 211 on rod 203 (FIG. 7) when the apparatus is set in the cross-slide mode; that is, the mode in which the cross-slide 16 is driven inwardly and outwardly. This switch enables the cross-slide to be fed inwardly and retracted and disables lubricating solenoid SB (FIG. 9) for the bed. Limit switch 6LS is actuated by notch 213 on rod 203 when the apparatus is set in the carriage mode; that is, the mode in which the carriage 14 is moved to the left or right. This switch 6LS enables the actuation of the carriage 14 and deenergizes the hydraulic dump solenoid SH so that the hydraulic cylinders 71, 73 and clamp 75 are released permitting the carriage to move left or right. Limit switch 7LS is operable by an adjustable dog 155 (FIGS. 1, 10, 11) on the cross-slide 16 which may be set to a desired distance of return of the cross-slide 16. In use a full return of the cross-slide 16 to its limiting out position is not desirable. Limit switch 8LS is operable by a pin 151 (FIGS. 1, 10) and limits the depth of cut which is taken into the work W.

Adjustable dogs 151 and 155 are each in the form of a block having an apron 152 (FIGS. 10, 11) from which a projection 154 extends. The projection 154 actuates the limit switch 8LS or 7LS as the case may be. The dogs 151 and 155 are mounted on a T-slot 170 in the cross-slide 16 by a bolt 172 whose head extends into the cross bar of the slot and whose tip is secured to the apron 152 by a nut 174. To set the dog 151 or 155 the nut is loosened and the dog moved along the slot to the proper position. A scale 176 is provided on the cross-slide 16 along the T-slot 170 to aid in setting the dogs. It is particularly important that dog 151 be set with reasonable precision to set the depth of cut.

Figure 7:
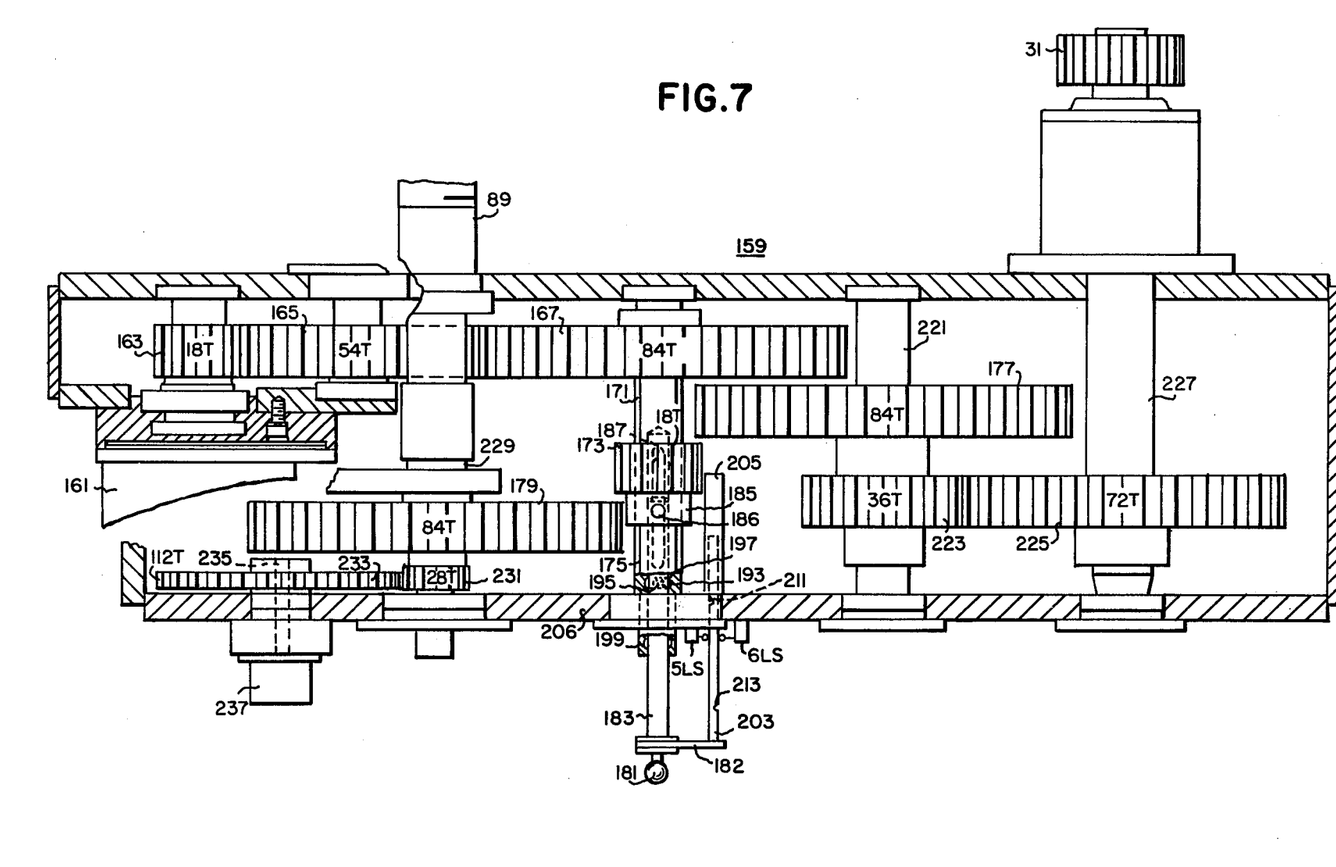
FIG. 7 is a plan view, with the top of the gear box removed, of the drive for the cross slide which carries the cutting-tool assembly and for the carriage which carries the cross-slide of the apparatus shown in FIG. 1.
Figure 8:
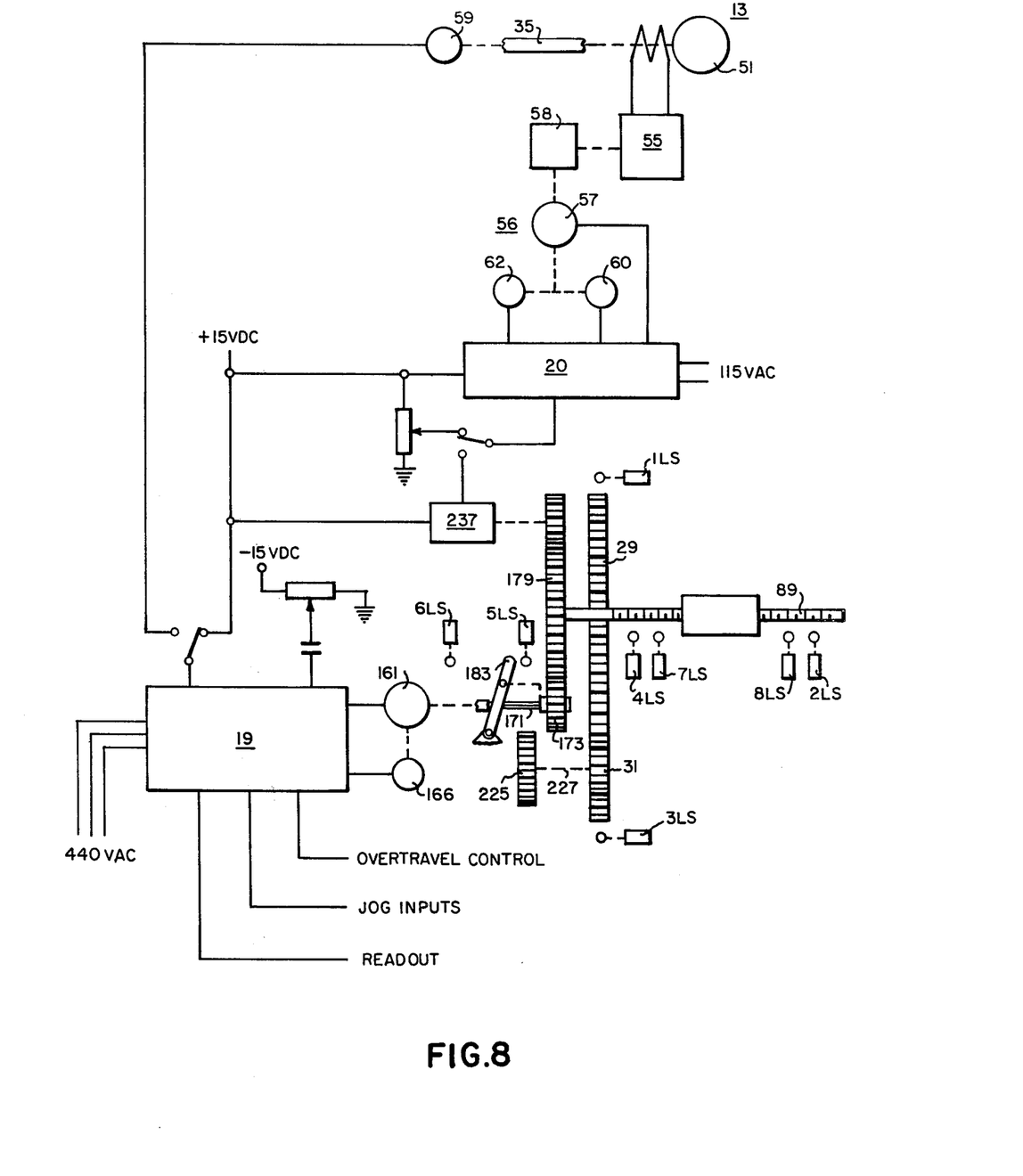
FIG. 8 is a block diagram of the control system of the apparatus in accordance with this invention.
Figure 9:
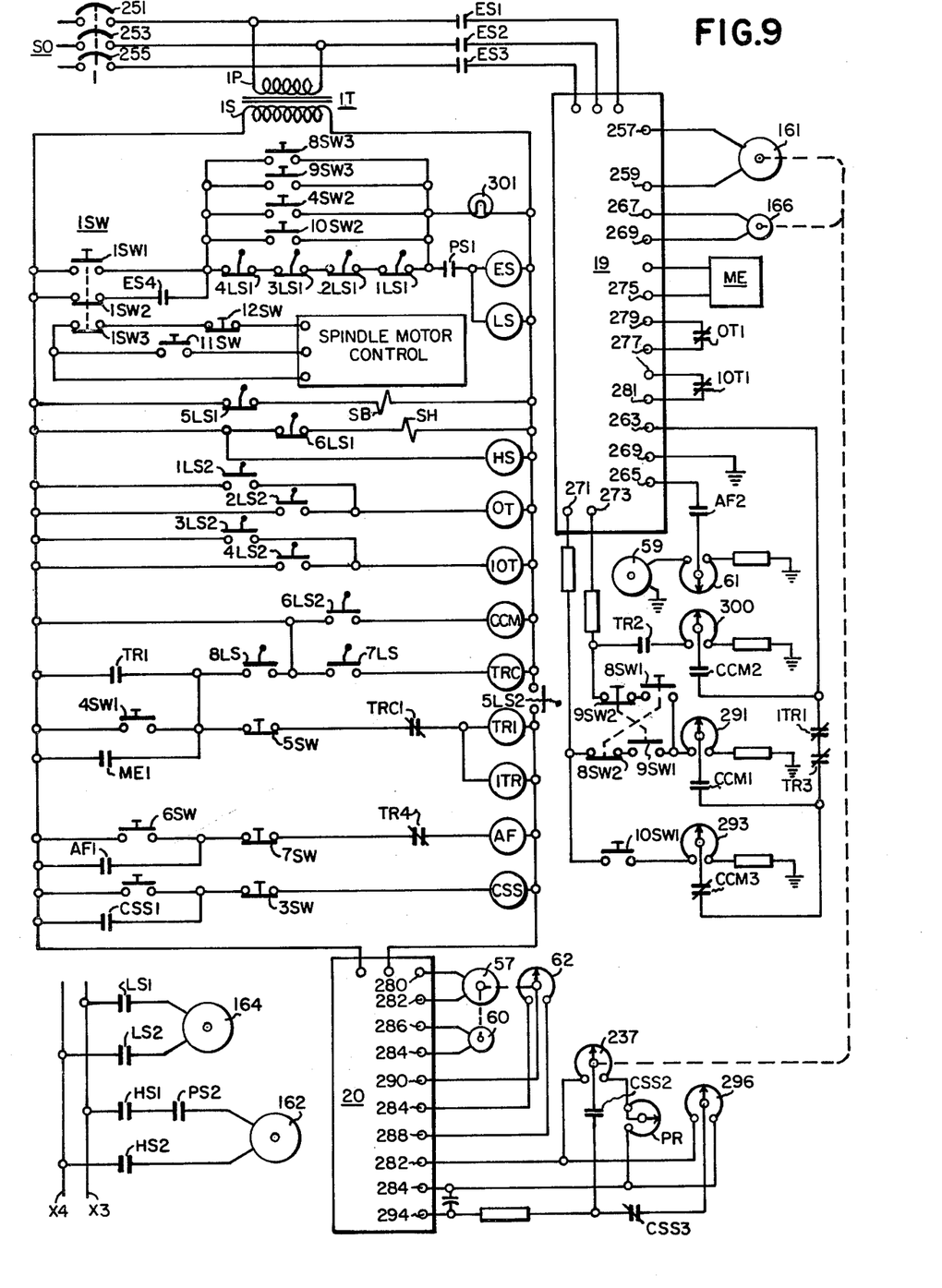
FIG. 9 is a schematic of this control system.

The drive 17 for the carriage 14 and cross-slide 16 includes, in addition to the gear box 159 and screw 89, a motor 161 which drives the carriage 14 along the bed 21 and also the cross-slide towards and away from the work W (FIGS. 1, 7). The motor 161 is herein called the cutting-tool motor or cross-slide motor or carriage motor. The motor 161 should have sufficient torque to produce adequate pressure to cut the work W and to achieve an adequate chip load. Where the work is composed of tool steel, the pressure may be as high as 150,000 or 200,000 pounds per square inch. Typically, the area of the cut taken at each instant is about 0.01 square inch. A force of 1500 or 2000 pounds would then be a lower limit. A force of about 10,000 pounds is preferred. Typically, the motor 161 is a DC motor having a maximum speed of 1000 RPM and delivering about three horsepower at this speed. The servo controller 19 supplies this motor with constant current, the voltage being varied to vary the speed. The motor has a permanent-magnet field. This motor so supplied has a constant torque down to zero revolutions per minute. For convenience it is assumed that counterclockwise rotation of motor 161 moves the cross-slide towards work W and clockwise rotation away from the work; also that clockwise rotation of motor 161 moves the carriage towards the right and counterclockwise rotation towards the left. A tachometer 166 is driven by the motor 161 and connected in feedback relationship with the motor 161 (FIGS. 8, 9).

A hydraulic pump motor 162 is mounted laterally on the gear box 159. This motor 162 when actuated on energization of solenoid HS (FIG. 9) causes fluid to flow into the clamping cylinders (71, 73) and the hydraulic clamp (75). A lube motor 164 is also mounted laterally on the gear box 159 and provides lubrication for the apparatus when actuated on energization of solenoid SB.

The motor 161 drives the carriage 14 and the cross-slide 16 through a system of gears on the gear box 159 (FIG. 7). The motor 161 drives a pinion 163 which in turn drives an idler gear 165 at a substantially lower rotational speed. The latter gear drives a gear 167. Gear 167 drives a shaft 171. A pinion 173 is splined to the shaft 171. The pinion 173 is provided with internal longitudinal teeth which engage external longitudinal teeth on the shaft 171 to form the spline 175. The pinion 173 is slideable along the spline 175 into engagement with a gear 177 through which pinion 31 is driven, or, with gear 179 through which screw 89 is driven.

The shifting of the pinion 173 is effected by a gear-shift knob 181 (FIGS. 1, 2 and 7), which moves a bracket 182, carrying shaft 183 inwardly or outwardly from the neutral position, in which the pinion 173 is shown in FIG. 7. The shaft 183 is connected to the hub 185 of pinion 173 through a pin 186 which is slideable in a slot 187 in the driven shaft 171 as the gear 173 is shifted along the shaft 171. The shaft 171 has a lateral slot which carries a ball 193 urged outwardly by a spring 195. The gear 173 is locked in the "in" position by engagement of this ball 193 in an indent 197 and in the "out" position by the engagement of this ball in an indent 199. The shaft 183 is mounted rotatably in the bracket 182. At its opposite end the bracket 182 carries a rod 203 which is slideable in a tube 205 mounted in the front wall 206 of gear box 159. Limit switches 5LS and 6LS are mounted adjacent the rod 203. In the netural position limit switches 5LS and 6LS have closed contacts 5LS1 and 6LS1 and open contacts 5LS2 and 6LS2. The rod 203 is provided with an indent 211 which actuates limit switch 5LS when the pinion 173 engages gear 177 and another indent 213 which actuates limit switch 6LS when the pinion 173 engages gear 179.

Gear 177 drives a shaft 221 on which gear 223 is rotated. Gear 223 drives gear 225 which drives the shaft 227 on which pinion 31 is rotated. Gear 179 drives a shaft 229 on which screw 89 is rotated. A pinion 231 is mounted near the opposite end of shaft 229. Pinion 231 drives a gear 233 which in turn drives a shaft 235 on which a linear transducer in the form of a potentiometer 237 is rotated (that is, the wiper of the potentiometer is rotated along the resistance wire). The potentiometer 237 serves to measure the traverse of the tool 103 into the work W. Typically the screw 89 may have 100 turns and the potentiometer 237, 25 turns. The potentiometer 237 then moves at one-fourth the rotational speed of the screw 89. Potentiometer 237 is a servo potentiometer which sets the servo controller 20 to control the speed of the drive 13 (FIGS. 8 and 9). Typically teeth numbers are indicated in the gears in FIG. 7.

FIGS. 8 and 9 show diagrammatically the relationship between the motor 161 and the components which this motor drives.

The servo drive 18 is energized from a conventional commercial three phase power supply SO through the contacts 251, 253, 255 (FIG. 9) of a circuit breaker CB1 which is closed when the door of the cabinet (not shown) housing controllers 19 and 20 is closed. Power for actuating the control components is derived from a transformer 1T. The primary 1P of the transformer 1T is supplied from one phase of the supply SO through the contacts 251 and 253. The secondary 1S of this transformer supplies the terminals X1 and X2 which are connected in energizing relationship with the components of the servo controller 19 and also supply servo controller 20.

The servo controller 19 is energized through contacts ES1, ES2, ES3 of emergency stop relay ES and includes a preamplifier and a power section (not shown in detail) both of the solid-state type. Typically, the power section includes power transistors (not shown) which are connected to convert the power derived from the supply SO into controlled direct current. The output of the power section supplies the motor 161, which drives the carriage 14 and the cross-slide 16, through output terminals 257 and 259.

The servo-controller 19 has an input 263 for jog operation, and input 265 for automatic-feed operation, an input 267 for tachometer 166 and a common terminal 269 to which these inputs 263, 265, 267 are referred. The controller 19 has terminals 271 and 273 for deriving voltage, typically +15 volts and −15 volts, with reference to common 269, for jogging clockwise or counterclockwise. The controller has a common terminal 277 and terminals 279 and 281 appropriately connected for limiting clockwise or counterclockwise rotation of the motor 161. Typically, the counterclockwise rotation of the motor 161 drives the carriage 14 towards the head stock 37 and the slide 16 towards the work W. Terminals 279 and 277 are connected in series with back contact OT1 or relay OT and when this contact is opened, the controller 19 is disabled from supplying the counterclockwise power to the motor 161. Likewise, clockwise rotation of the motor 161 moves the carriage 14 towards the tail stock (not shown) and retracts the slide 16. Back contact 1OT1 of relay 1OT is connected in series with terminals 281 and 277 and when contact 1OT1 is opened, clockwise drive of the motor 161 is precluded. There is also a terminal 283. Tool pressure meter Me is connected between terminal 283 and terminal 275. When the current through motor 161 exceeds a predetermined magnitude, indicating overload of the motor 161, meter ME closes its contact ME1 causing the tool to be retracted.

Servo controller 20 is also of the solid-state type. This controller includes output terminals 280 and 282 for motor 57. It also includes an input terminal 286 and a common terminal 284 for feedback from the tachometer 60. The 10 turn feedback potentiometer 62 is supplied, typically with −15 volts DC between terminal 288 and common 284. The position intelligence is supplied through terminal 290. The cross-slide potentiometer 237 is supplied with +15 volts between terminal 292 and common 284. The intelligence from potentiometer 237 is supplied to terminal 294 through contact CSS2 of relay CSS and the intelligence from manual spindle speed-setting potentiometer 296 is likewise supplied through contact CSS3.

There are in addition to relays ES, OT and 1OT, relays LS, HS, CCM, TRC, TR, 1TR, AF and CSS. The functions and contacts and status of the contacts of these relays are shown in the following Table II:

TABLE II

| Relay | Function | Contacts and Status for Relay Deenergized | |
|---|---|---|---|
| | | NO | NC |
| LS | Energizes lubrication motor | LS1, LS2 | |
| ES | Emergency stop | ES1, ES2, ES3, ES4 | |
| HS | Energizes hydraulic motor | HS1, HS2 | |
| OT | Over travel relay-CCR | | OT1 |
| 1OT | Over travel relay-CR | | 1OT1 |
| CCM | Permits carriage travel and prevents cross-slide operation | CCM1 | CCM2, CCM3 |
| TRC | Tool Retract Completed | | TRC1 |
| TR | Tool Retract | TR1, TR2 | TR3, TR4 |
| 1TR | Tool Retract | | 1TR1 |
| AF | Automatic Feed | AF1, AF2 | |
| CSS | Constant Surface Speed | CSS1, CSS2 | CSS3 |

There are also pressure limit switches PS1, normally open, for the lube system and PS2, normally closed, for the hydraulic system.

In addition to the automatic-feed rate potentiometer 61, the feedback potentiometer 62, the cross-slide potentiometer 237 and the manual potentiometer 296, the servo-drive 18 includes a potentiometer 291 for setting the jogging speed for the carriage 14, a potentiometer 293 for setting the jogging speed for the cross-slide 16 to jog the tool 103 towards the work W, and a potentiometer 300 for setting the speed of retracting the tool 103 from the work. The potentiometers 61, 291, 293 and 300 each includes a variable resistor R3, R1, R2 and R10, respectively, for setting the speed or rate; a resistor R4, R6, R5, R7, respectively, for setting the range of variation is in series with each variable resistor. A range potentiometer RP is in series with potentiometer 237.

The servo-control unit also includes momentary switches 1SW, 2SW, 3SW, 4SW, 5SW, 6SW, 7SW, 8SW, 9SW. The following Table III shows the function of these switches:

TABLE III

| Switch | Function | Normal Status | |
|---|---|---|---|
| 1 SW | Emergency Stop-Start | NO | 1SW1 For Start- |
| | | NC | 1SW2 For Stop-NC 1SW3 |
| 2 SW | Constant Surface Speed | NO | |
| 3 SW | Constant Surface Speed OFF | NC | |
| 4 SW | Tool Retract | NO | 3SW1, 3SW2 |
| 5 SW | Tool Stop | NC | |
| 6 SW | Automatic Feed | NO | |
| 7 SW | Automatic Feed "off" | NC | |
| 8 SW | Carriage Jog Left | NO | 8SW1 with Interlock |
| | Motor 161 CCR | NC | 8SW2 and NO 8SW3 |
| 9 SW | Carriage Jog Right | NO | 9SW1 With Interlock |
| | Motor 161 CW | NC | 9SW2 NO 9SW3 |
| 10 SW | Jog Tool In | NO | 10SW1, 10SW2 |
| 11 SW | Spindle Motor Start | NO | |

TABLE III-continued

| Switch | Function | Normal Status |
|---|---|---|
| 12 SW | Spindle Motor Stop | NC |

Operation

With the door of the servo drive 18 closed, circuit breaker CB1 is closed and there is voltage at terminals X1, X2 of Secondary 1S. Servo controller 20 is energized. If the pressure for lubrication is adequate PS1 is closed; operation cannot start unless this pressure is adequate. There is also power across auxiliary supply terminals X3, X4. Switch 1SW is now pulled upwardly (shown downward in FIG. 9) momentarily closing 1SW1 and opening 1SW2. Relay ES is energized in circuit X1, 1SW1, 4LS1, 3LS1, 2LS1, 1LS1, PS1, ES, X2. Relay LS being in parallel with ES is also energized. LS1 and LS2 are closed and the lube motor 164 is energized in circuit X3, LS1, 164, LS2, X4. The apparatus is lubricated. Power is supplied to servo controller 19; this controller is energized through contacts ES1, ES2, ES3. Relays ES and LS are locked in at contact ES4, in circuit X1, 1SW2, ES4, 4LS1, 3LS1, 2LS1, 1LS1, PS1, ES and LS, X2, when switch 1SW is returned to normal. The motor 161 is now energized through servo controller 19. The tachometer 166 impresses a potential on controller 19 through inputs 267 and 269 in rate-negative-feedback relationship and, in the absence of signals on iputs 263 and 265, the motor 161 is in a holding-torque condition. The emergency stop relay circuit is provided with an indicator 301 connected in circuit X1, 1SW2, ES4, 4LS1, 3LS1, 2LS1, 1LS1, ES and LS, X2 and is energized indicating that the servo drive 18 is energized. In the event of an emergency, switch 1SW is pressed downwardly opening the circuit through relay ES4 and the indicator 301.

To set the carriage 14 for a cutting operation, knob 181 is first pushed inwardly meshing pinion 173 and gear 177 and closing limit switch 6LS, 6LS1 is opened preventing locking of the carriage 14 by cylinders 171, 173 and clamp 175. 6LS2 is closed. Relay CCM is energized in circuit X1, 6LS2, CCM, X2. Potentiometer 291 is connected to the input 263 of servo controller in a circuit, ground, R6, 291, CCM1, TR3, 1TR1, 263. Closure of pushbutton 8SW impresses a positive voltage (+15 volts) through 8SW1 (jog left) from terminal 271 of servo controller 19 through resistor R8, 9SW2, 8SW1, 291, R6, ground. Motor 161 is actuated to move the carriage 14 to the left; i.e., towards head stock 33. The jog right circuit is opened at interlock 8SW2. For the eventuality that the carriage 14 has moved beyond the righthand limit and 3LS1 is opened, 8SW3 is closed. In this eventuality 1SW must be held closed while jogging 8SW until the carriage is returned to the bed and 3LS1 is reclosed. While 3LS is actuated 3LS2 is closed and 1OT is actuated. 1OT1 is opened precluding clockwise rotation of motor 161. Closure of pushbutton 9SW (jog right) impresses a negative voltage (−15 volts) on input 263 from terminal 273 through resistor R9, 8SW2, 9SW1, 291, R6, ground, energizing motor 161 to move the carriage 14 away from head stock 33. The speed of jogging is set by potentiometer 291. Contact 9SW3 is similar to 8SW3 permitting operation when limit-switch contact 1LS1 is open.

The driving of the carriage 14 into the head stock 33 while jogging to the left is prevented by the operation of limit switch 1LS. Contact 1LS1 is opened to deenergize relay ES and the motor 161; contact 1LS2 actuates overtravel relay OT opening contact OT1 and preventing further counterclockwise rotation of motor 161. With 1LS1 open, the carriage 14 may now be moved away from the head stock 33 by jogging switch 9SW, if necessary, while holding 1SW closed. Since 1LS2 is closed so that OT1 is open, the carriage 14 cannot be moved towards the head stock 33 by inadvertent actuation of switch 8SW.

Once the carriage is properly set, the tool 103 is moved into cutting engagement with the work. For this purpose the knob 181 is moved outwardly meshing pinion 173 with gear 179. Also, limit switch 5LS is actuated and 6LS set in standby condition. 5LS1 opens deenergizing the lube solenoid SB. 6LS1 recloses energizing relay HS and also energizing the hydraulic dump solenoid SH. Contacts HS1 and HS2 are closed and the hydraulic motor 162 is energized. Cylinders 171 and 173 and clamp 175 lock the carriage 14 in the position in which the bit 103 is aligned with the region of the work where the cut is to be made. 5LS2 closes preparing circuits for energizing relays TR and 1TR on the closure of 4SW1 or ME1, relay AF on closure of 6SW and relay CSS on closure of 2SW. Also 6LS2 reopens deenergizing relay CCM and opening the circuit between potentiometer 291 and servo controller 19 at CCM1. At reclosed contact CCM3 potentiometer 293 is now connected to the servo controller 19 in circuit ground, R5, 293, CCM3, TR3, 1TR1, 263, 269. The tool 103 may be moved towards the work by switch 10SW. Closure of 10SW1 applies a positive voltage (+15 volts) in nput 263 through 271, R8, 10SW1, potentiometer 293, CCM3, TR3, 1TR1, 263, 269 causing the motor 161 to drive the cross-slide 16 towards the work W. For the eventuality that the cross-slide 16 is beyond the outer limit and 4LS1 is open, 10SW2 is closed. In this case 1SW is held closed while 10SW is jogged until 4LS1 recloses. AT 4LS2 relay 1OT is actutated preventing clockwise rotation of motor 161.

In positioning the tool 103 in cutting relationship with the work W, it may be necessary to retract the tool 103 from the work. Potentiometer 300 controls the speed of retraction. When contact CCM2 closes, potentiometer 300 is connected to servo controller 19 in circuit: ground, R7, 300, CCM2, 263, 269. To retract the tool 103, switch 4SW is closed. Relays TR and 1TR are energized in circuit: X1, 4SW1, 5SW, TRC1, TR-1TR, X2 and locked in circuit X1, TR1, 5SW, TRC1, TR-1TR, X2. A negative voltage is impressed on potentiometer 300 in circuit 273, R9, TR2, 300, CCM2, 263, 269. The retracting of the tool 103 may be interrupted manually by momentarily opening switch 5SW. The speed of retracting is controlled by setting potentiometer 300. For the eventuality of over travel towards the work, 4SW2 is closed to shunt out open 2LS1 until the cross-slide 16 is reset. OT is actuated through 2LS2 to open the counterclockwise circuit for motor 161.

Once the bit 103 is properly positioned at the work, switch 5SW is opened to deenergize relays TR and 1TR. Switch 10SW is open. In the typical practice of this invention the cutting is automatic at a constant surface speed. To achieve this object, switch 2SW is closed energizing relay CSS in circuit: X1, 2SW, 3SW, CSS, 5LS2, X2 and locking this relay in through CSS1 contact CSS2 is closed connecting position potentiometer 237 to the input 282-294 of servo controller 20. Contact CSS3 is opened disconnecting the manual spindle speed potentiometer 296. In addition, 6SW is closed actuating relay AF in circuit X1, 6SW, TR4, AF, 5SL2, X2. Relay AF is locked in through AF1. AF2 is closed connecting potentiometer 61 to the input of servo-controller 19 in circuit: ground, R4, 61, AF2, 265, 269. The spindle motor 51 is not yet in operation and tachometer 59 supplies no voltage across potentiometer 61. At this point switch 1SW is reset and 1SW3 is closed.

The spindle motor 51 is now energized at its minimum speed by closing switch 11SW. At this time the dove-tail 83 is locked on the carriage 14 by the hydraulic cylinders and the clamping cylinders including 71, 73, 75. With the spindle motor 51 in operation, potential from tachometer 59 appears across potentiometer 61. At this point relays ES, LS HS, AF, CSS, and hydraulic solenoid SH are energized and relays OT, 1OT, CCM, TR, 1TR and solenoid SB are deenergized.

The bit 103 is now fed in cutting relationship with the work W by screw 89 which is driven by motor 161. The chip load may be set by setting variable potentiometer 61. This potentiometer should be set so that the work W is readily cut at an appropriate speed while the chips readily flow from the groove. As the bit 103 moves into the Work W, the voltage impressed by wiper 311 of potentiometer 237 on servo controller 20 changes and the spindle-motor control, variable transformer, 55 is commanded to increase the speed of the spindle motor 51, by decreasing the field 13, as the tool 103 penetrates into the work W acting over progressively smaller diameters of the work W. The cutting of the work W now continues. The tachometer 60 feeds back intelligence as to the speed of motor 57 to servo controller 20 and potentiometer 62 intelligence as to position; that is, as to the potential supplied to the field 13.

In the event that cutting need be aborted because of improper operation of the tool 103 or slide 16, switch 1SW is actuated to open 1SW2 and 1SW3, relays AFT and CSS and stopping the automatic feeding of the tool 103. The automatic-feed operation may also be stopped by closing switch 4SW. Relays TR and 1TR are then energized. Contact TR4 is opened stopping the automatic feed operation and the tool 103 is retracted by the closing of TR2.

A phenomenon which has been experienced, in the cutting of such materials as tool steel with hard alloys, is that the tool 103 tends to become dull. If a dull tool 103 were permitted to continue to penetrate into the work W, it would become crushed and produce an undesirable clogging of the groove being cut. To preclude this condition meter ME is provided. A dull tool overloads motor 161; the overload is detected by meter ME, closing its contact ME1 across 4SW1, actuating relays TR and 1TR and retracting the tool 103.

Barring improper operation, the tool 103 or a replacement produces the desired cut in the work W. Dog 151 is set to actuate limit switch 8LS at a position corresponding to the desired depth of cut and when this position is reached, 8LS is closed. Relays TR and 1TR are actuated in circuit X1, 8LS, 5SW, TRC1, TR-1TR, X2 and locked in in circuit X1, TR1, 5SW, TRC1, TR-1TR, X2. The automatic feed is interrupted by deenergizing relay AF at TR4 and the tool 103 is retracted by the closing of contact TR2. Limit switch 8LS reopens but the retracting circuit remains locked in at TR1. The retracting of the tool 103 may be stopped manually by opening switch 5SW. The retraction of the tool 103 stops automatically on the completion of the retraction.

At this point limit switch 7LS is closed energizing relay TRC. Relays TR and 1TR are deenergized at TRC1.

Figure 12:
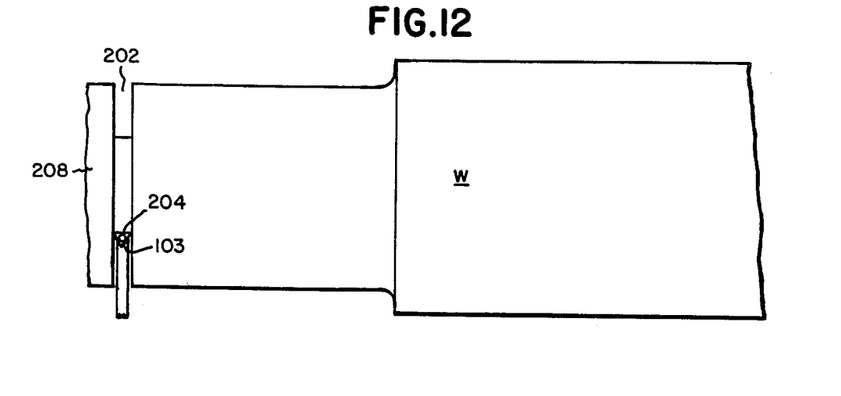
FIGS. 12 and 13 are diagrammatic views showing the final steps in a cutting operation.

Typically, in the practice of this invention, a groove 202 (FIGS. 12, 13) is first cut to the desired depth in the work W with the cutting edge 204 of the bit 103 in engagement with the inner surface of the groove along its whole length as shown in FIG. 12. When a predetermined depth is reached, the tool 103 is seated so that its corner 206 engages the side of the groove 202 away from the end 208 to be severed. A sharp neck is cut in the groove facilitating removal of the end 208 while leaving substantially no button.

Typically, one turn of the potentiometer 237 corresponds to four turns of the screw 89. Typically, the servo-controller 20 operates to reduce the field current through the motor 51 as the cutting progresses. In lieu of field weakening by a variable transformer 55 there may be field weakening by a rheostat or the armature of the spindle motor 51 may be controlled directly. Within the scope of this invention the servo-controller 20 may be set to increase the speed of motor 51 at a predetermined rate which may be prevented from deviating by the signal from potentiometer 237.

The control loop for motor 51 is a closed loop including: motor 51, tachometer 59, servo-controller 19, motor 161, potentiometer 237, servo-controller 20, drive 56, variable transformer 55, field 13. Servo-controller 20 is usually set so that there is positive feedback in this loop. However, stability is maintained by the high inertia of motor 51 and work W.

It is within the scope of this invention to dispense with potentiometer 237 and set the spindle motor 51 to increase at predetermined rate dictated by the depth of cut desired. For this purpose relay CSS is deenergized by opening switch 3SW (or left deenergized). CSS2 is opened and CSS3 reclosed. The servo-controller 20 is then controlled from manual potentiometer 296.

While preferred embodiments of this invention have been disclosed herein, many modifications thereof are feasible. This invention is not to be restricted except insofar as is necessitated by the spirit of the prior art.

I claim:

1. Apparatus for cutting work including cutting-tool means including a work-cutting tool, a first drive including a variable-speed motor for rotating said work, a second drive including a variable-speed motor, connected to said cutting-tool means, for driving said tool into cutting engagement with said work as said work is rotated, means, connected to said first drive, for controlling the speed at which said work is rotated, means, including said controlling means, interconnecting said first drive and said second drive, for coordinating the speed at which said work is rotated and the speed at which said second drive drives said tool into cutting engagement with said work to set said speeds at magnitudes such that the rate at which said tool passes over said work in cutting relationship is maintained at a predetermined magnitude, said interconnecting means including means for generating a potential dependent on the speed of rotation of said work for controlling the speed of said second drive, and control means, positionally responsive to the penetration of the said tool in said work, and connected to said speed controlling means for said first drive for varying the speed of rotation of said work with the depth of penetration into said work of said tool.

2. The apparatus of claim 1 wherein the first drive and the second drive are interconnected by the controlling means, and the penetration-responsive means is connected in a closed-loop positive feedback circuit, the said apparatus including means, connected to said second drive, and responsive to the force exerted by the work-cutting tool on the work, for retracting the tool from the work when said force exceeds a predetermined magnitude.

3. The apparatus of claim 1 including means, connected to the second drive for actuating said second drive to retract the tool completely from cutting engagement with the work and means connected to said actuating means for disabling the speed controlling means when the second drive is actuated to retract said tool.

4. Apparatus for cutting work including cutting-tool means including a work-cutting tool, said cutting-tool means including a vertical plate tapering along the upper side thereof to a tip, said plate having at said tip a seat, and means for securing said work-cutting tool in said seat, a first drive including a variable-speed motor for rotating said work, a second drive including a variable-speed motor, connected to said cutting-tool means, for driving said tool into cutting engagement with said work as said work is rotated, means, connected to said first drive, for controlling the speed at which said work is rotated, and means, including said controlling means, interconnecting said first drive and said second drive for coordinating the speed at which said work is rotated and the speed at which said second drive drives said tool into cutting engagement with said work to set said speeds at magnitudes such that the rate at which said tool passes over said work in cutting relationship is maintained at a predetermined magnitude, said work-cutting tool when driven by said second drive engaging and penetrating said work radially in cutting engagement therewith and cutting a groove of substantial depth in said work, the chips of the cutting flowing along said taper on the upper side of said cutting-tool means, said taper being such as to facilitate the flow of chips out of said groove.

5. The apparatus of claim 4 wherein the tool is seated at an angle to said seat such that the engagement of the tool with the work firmly secures the tool in the seat.

6. The apparatus of claim 4 wherein the tool is of generally triangular form and is seated in the seat so that the work is engaged by an edge of the tool constituting one side of the face of the triangle, and also the tool is seated in said seat at an angle such that the engagement of the tool with the work firmly secures the tool in the seat.

7. The apparatus of claim 4 wherein the plate is lined along the taper with a lining resisting abrasion by chips.

8. In an apparatus for cutting in work of a groove of substantial depth and width the combination including a lathe having way means and having means for rotatably supporting said work, a carriage moveable along said way means towards and away from said work, work-cutting tool means moveable on said carriage towards and away from cutting engagement with said work, said work-cutting-tool means including a vertical plate of smaller thickness than said width and of length greater than said depth, said plate tapering along the upper side thereof to a tip, said plate having at said tip a seat, and means for securing a cutting tool in said seat, the taper being along the side of the plate over which the chips flow as the tool engages and cuts said work, the taper being such as to facilitate the flow of chips out of said groove.

9. The combination of claim 8 wherein the work-cutting tool means is moveable on the carriage towards and away from the work on a massive support with which the vertical plate is integral.

10. The combination of claim 8 wherein on its side adjacent to the work the plate is curved corresponding generally to the curvature of the work.

11. Apparatus for cutting work including cutting-tool means including a work-cutting tool, said work-cutting tool means including a plate tapering along one side thereof to a tip, said plate having at said tip a seat, and means for securing said tool in said seat, a first drive for rotating said work, a second drive, separate from said first drive, connected to said cutting-tool means, for driving said tool into cutting engagement with said work as said work is rotated, said work-cutting-tool means also including means applying a thrust force on said plate, generally perpendicularly to the direction of the force applied to said work by said tool, to prestress said plate generally perpendicularly to said direction, means, connected to said first drive, for controlling the speed at which said work is rotated, and means, interconnecting said first drive and said second drive for coordinating the speed at which said work is rotated and the speed at which said second drive drives said tool into cutting engagement with said work to set said speeds at magnitudes such that the rate at which said tool passes over said work in cutting relationship is maintained at a predetermined magnitude.

12. Apparatus for cutting work including cutting-tool means including a work-cutting tool, said work-cutting tool means including work-cutting tool support means, a first drive for rotating said work, a second drive, separate from said first drive, connected to said cutting-tool means, for driving said tool into cutting engagement with said work as said work is rotated, said work-cutting-tool means also including means applying a thrust force on said support means, generally perpendicularly to the direction of the force applied to said work by said tool, to prestress said support means generally perpendicularly to said direction, means, connected to said first drive, for controlling the speed at which said work is rotated, and means, interconnecting said first drive and said second drive, for coordinating the speed at which said work is rotated and the speed at which said second drive drives said tool into cutting engagement with said work to set said speeds at magnitudes such that the rate at which said tool passes over said work in cutting relationship is maintained at a predetermined magnitude.

13. Apparatus for cutting work including cutting-tool means including a tool support and a work-cutting tool supported by said support and drive means, connected to said support for driving said tool into cutting engagement with said work, said work-cutting tool means also including means applying a thrust force to said support, generally perpendicular to the direction of the force applied to said work by said tool, to prestress said support generally perpendicular to said direction.

14. The apparatus of claim 13 wherein the tool support includes a plate tapering along the upper side thereof to a tip, said plate having at said tip a seat, and said support including means for securing said work-cutting tool in said seat, said thrust force being applied to said plate.

15. In an apparatus for cutting in work of a groove of substantial depth and width, the combination including a lathe having way means and having means for rotatably supporting said work and also having first drive means for rotating said work, a carriage moveable along said way means towards and away from said work, work cutting tool means moveable in said carriage towards and away from cutting-tool engagement with said work, second drive means for driving said cutting-tool means towards and away from cutting engagement with said work, said cutting-tool means including a vertical plate of smaller thickness than said width and of length greater than said depth, said plate tapering along the upper side thereof to a tip, said plate having at said tip a seat, and means for securing a cutting tool in said seat, and means interconnecting said first and second drive means to coordinate the rotation of said work and the cutting of said work by said cutting-tool means, the taper of said plate being along the side of said plate over which the chips flow as the tool engages and cuts said work, the taper being such as to facilitate the flow of chips out of said groove.

16. In an apparatus for cutting in work of a groove of substantial depth and width, the combination including a lathe having way means and having means for rotatably supporting said work, a carriage movable along said way means towards and away from said work, work-cutting tool means moveable on said carriage towards and away from said work, said work-cutting tool means including a vertical plate of smaller thickness than said width and of length greater than said depth, said plate having a seat adjacent to the position where said work is supported and means for securing a cutting tool in said seat, said plate extending from said tool laterally towards the position of said work so as to be under said work and being formed so as to clear the work, the extension of said plate adding support for the tool and thus adding a greater bearing surface for loads applied through said tool.

17. In an apparatus for cutting in work of a groove of substantial depth and width, the combination including a lathe having way means and having means for rotatably supporting said work, a carriage moveable along said way means towards and away from said work, work-cutting tool means moveable on said carriage towards and away from said work, said work-cutting tool means including a vertical plate of smaller thickness than said width and of length greater than said depth, a cutting tool extending from said plate to a position where said tool is engageable with said work for cutting said work, said plate extending from said tool laterally towards the position of said work so as to be under said work and being formed so as to clear the work, the extension of said plate adding support for the tool and thus adding a greater bearing surface for loads applied through said tool.

* * * * *